US 7,496,739 B1

(12) United States Patent
Raghavan et al.

(10) Patent No.: US 7,496,739 B1
(45) Date of Patent: Feb. 24, 2009

(54) SYSTEM AND RELATED METHODS FOR AUTOMATICALLY CONFIGURING A COMPUTING SYSTEM

(75) Inventors: Kartik N. Raghavan, Seattle, WA (US); Joseph G. Dadzie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 690 days.

(21) Appl. No.: 09/608,028

(22) Filed: Jun. 30, 2000

(51) Int. Cl.
*G06F 21/00* (2006.01)

(52) U.S. Cl. .............................. 713/1; 713/2; 713/100; 713/191; 717/170; 717/173; 717/175; 717/177; 709/219; 709/220; 709/221

(58) Field of Classification Search ................. 713/200, 713/1, 2, 100, 191; 709/223, 220, 219, 221; 370/401; 710/103; 395/500; 717/170, 173, 717/175, 177
See application file for complete search history.

(56) References Cited

U.S. PATENT DOCUMENTS

| | | | | |
|---|---|---|---|---|
| 5,732,275 A | * | 3/1998 | Kullick et al. ............... | 717/170 |
| 5,809,287 A | * | 9/1998 | Stupek et al. ................. | 703/22 |
| 5,838,907 A | * | 11/1998 | Hansen ........................ | 709/220 |
| 5,845,077 A | * | 12/1998 | Fawcett ....................... | 709/221 |
| 5,870,610 A | * | 2/1999 | Beyda ......................... | 717/173 |
| 5,892,952 A | * | 4/1999 | Seko et al. .................... | 717/174 |
| 5,919,257 A | * | 7/1999 | Trostle ......................... | 726/22 |
| 5,974,474 A | * | 10/1999 | Furner et al. ................... | 710/8 |
| 6,012,088 A | * | 1/2000 | Li et al. ....................... | 709/219 |
| 6,047,273 A | * | 4/2000 | Vaghi ......................... | 705/410 |
| 6,067,568 A | * | 5/2000 | Li et al. ....................... | 709/223 |
| 6,094,531 A | * | 7/2000 | Allison et al. ................. | 717/176 |
| 6,151,643 A | * | 11/2000 | Cheng et al. ................... | 710/36 |
| 6,182,212 B1 | * | 1/2001 | Atkins et al. ................... | 713/1 |
| 6,212,585 B1 | * | 4/2001 | Chrabaszcz ................. | 710/302 |
| 6,243,774 B1 | * | 6/2001 | Eide et al. .................... | 710/302 |
| 6,292,941 B1 | * | 9/2001 | Jollands ....................... | 717/176 |
| 6,301,710 B1 | * | 10/2001 | Fujiwara ...................... | 717/175 |
| 6,535,976 B1 | * | 3/2003 | Hoggarth et al. ............... | 713/2 |
| 6,567,860 B1 | * | 5/2003 | Maxwell et al. ............. | 719/327 |
| 6,789,215 B1 | * | 9/2004 | Rupp et al. .................... | 714/38 |
| 6,976,062 B1 | * | 12/2005 | Denby et al. ................. | 709/220 |
| 6,990,591 B1 | * | 1/2006 | Pearson ........................ | 726/22 |
| 2002/0055924 A1 | * | 5/2002 | Liming ........................ | 707/100 |

* cited by examiner

*Primary Examiner*—Carl Colin
(74) *Attorney, Agent, or Firm*—Lee & Hayes, PLLC

(57) ABSTRACT

A system and related methods for automatically configuring a computing system includes receiving an identifier associated with a computing system, identifying the authorized and available resources for the computing system, assessing the current resources of the computing system, and downloading, installing and configuring zero or more needed resources on the computing system based, at least in part, on the assessment.

23 Claims, 7 Drawing Sheets

| 408 | | | | | | | | | | |
|---|---|---|---|---|---|---|---|---|---|---|
| 502 | 504 | OS CONFIGURATION/PERSONALIZATION (C/P) 506 | | | | INTERNET C/P 508 | | | | APPLICATION C/P 510 |
| USER_ID | GROUP_ID | TYPE | VER. | PASSWORD(S) | SETTINGS | NAME | VER. | PLUGINS | SETTINGS | NAME | VER. |
| 001352 | DEV_ENG | W2000 | 1.0 | ******* ******** | — — | INTERNET EXPLORER | 3.5.2 | NETSHOW | — — | WORD EXCEL | SB2000 SB2000 |

512

SYSTEM AND RELATED METHODS FOR AUTOMATICALLY CONFIGURING A COMPUTING SYSTEM

TECHNICAL FIELD

This invention generally relates to configuring computing systems and, more particularly, to a system and related methods for automatically configuring computing systems.

BACKGROUND OF THE INVENTION

Computing technology continues to evolve at a break-neck pace. Advanced multimedia applications, operating systems with integrated Internet access capability, and advanced speech recognition applications are but a few obvious examples of how far computing technology has evolved in recent years. One area, however, that has not kept pace with the other advances in computing technology lies in the initial setup and/or reconfiguration of such computing devices.

The current state-of-the-art of installing and configuring a computing system involves a collection of separate and disjointed steps and processes. Indeed, the process often requires the assistance of a technically competent technician to install and properly configure the operating system, Internet settings and applications on a computing system. Installation configuration information must be gathered and collected from a number of separate places, places that may only be known in specific locations or by specific people. Even when this initial set-up has been completed, additional time is required of the end-user to further personalize the operational settings for each of these elements of the computing environment.

Installation of the operating system (OS) typically requires a password for the computer, the name of the computer, and the type of network in which the computing system may participate. In addition, a prior understanding of which OS components and features of the operating system to enable is also required before completion of personalization and licensing options of the operating system occurs. Configuration and personalization of the Internet browser and other applications require a similar level of manual, user-interaction.

It will be appreciated that the information required to complete the installation/configuration/reconfiguration of a computing device is typically located on one or more corporate network(s), intranet networks, and/or a public network (e.g., the Internet), all of this information must be replicated or retrieved, sometimes on an individualized basis, to fully customizing configure computer. The disparate nature/sources of the information has heretofore stifled attempts to automate the configuration/reconfiguration process.

Thus, a system and related methods for configuring a computing device is required, unencumbered by the inherent limitations commonly associated with the prior art. Just such a solution is provided in the description to follow.

SUMMARY OF THE INVENTION

This invention concerns a system and related methods for configuring a computing system. According to a first aspect of the present invention, a method of configuring a computing system comprises receiving an access request from the computing system at a server, wherein an identifier associated with a user and/or the computing system is provided, and downloading one or more image files to automatically install/update one or more of an operating system, application(s), and personalized configuration setting information. In this regard, the claimed invention provides a means of automatically installing and configuring an operating system, applications and personalization settings of a computing system.

DETAILED DESCRIPTION

This invention concerns a system and related methods for automatically configuring a computing system. In this regard, the present invention overcomes a number of the limitations commonly associated with the prior art. For ease of illustration and explanation, and not limitation, the teachings of the present invention will be developed within the implementation context configuring a personal computing system and/or a communications device. It is to be appreciated, however, that the scope of the present invention extends well beyond the particular implementations described. In describing the present invention, example network architectures and associated methods will be described with reference to the above drawings. It is noted, however, that modification to the architecture and methods described herein may well be made without deviating from spirit and scope of the present invention. Indeed, such alternate embodiments are anticipated.

Example Data Network

Figure 1:
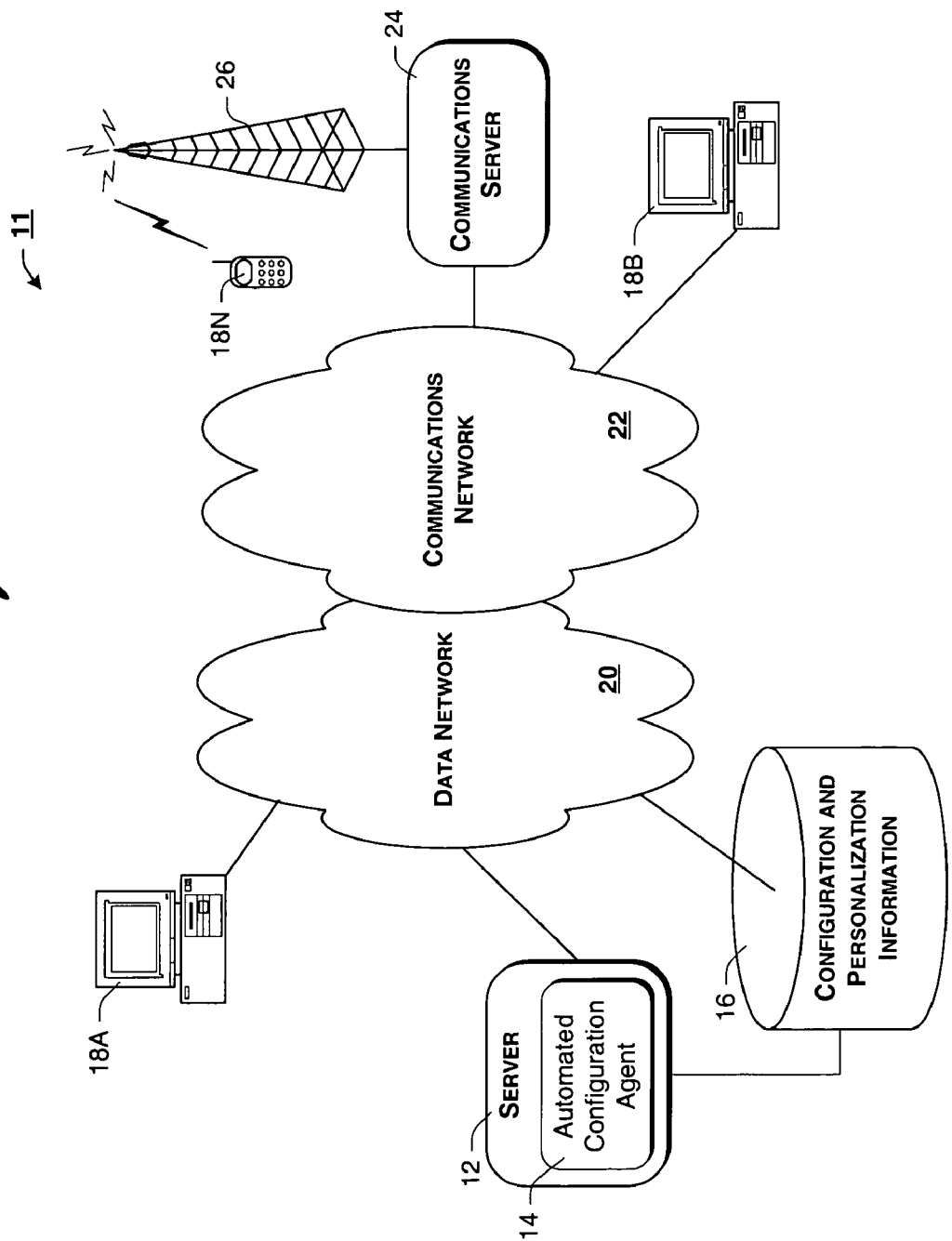
FIG. 1 is a block diagram of an example network with automated configuration facilities.

FIG. 1 illustrates a block diagram of an example network incorporating the teachings of the present invention. In accordance with the illustrated example embodiment of FIG. 1, network 11 is depicted comprising server 12 incorporating an innovative automated configuration agent 14, which automatically identifies system resources of a computing system (18A . . . N) associated with a received identifier, downloads and configures one or more of operating system(s), application, Internet and other personalization configurations and settings from one or more communicatively coupled data store(s) 16. In addition, network 11 includes computing systems 18A . . . N each communicatively coupled through a data network 20 and/or communications network 22 and appropriate communications server 24 and transmission medium, e.g., 26. It should be appreciated from the onset that use of the term computing system is intended to represent any of a number of electronic appliances known in the art including personal computing systems, communications devices, set-top appliances, and the like. As used herein, the term computing system 18 is intended to represent any of the computing systems 18A . . . N, whereas reference to a particular computing system (e.g., 18A) is intended to represent only that particular computing system. The same applies to other similarly enumerated elements.

In accordance with one aspect of the present invention, the operating system(s), applications, Internet settings, configuration and personalization information for any number of users is maintained on the one or more data stores 16. According to one embodiment, data store 16 is directly connected (or integrated with) server 12, while in alternate embodiments, the one or more data store(s) 16 are communicatively coupled to server 12 via one or more networks (e.g., 20, 22).

It will be appreciated, from the description to follow, that the unique identifier need not come from the computing system to be configured/reconfigured. Rather, the unique identifier may well come from another computing system or communication system element. In such an implementation, configuration agent 14 may well configure a first computing system (e.g., installing an operating system, applications and settings on a new computer system), while updating the resources of the computing and/or communication system element used to issue the unique identifier initiating the configuration process. In this regard, the automated configuration agent 14 not only addresses the limitations commonly associated with the prior art, but provides an extensible architecture that readily adapts to configure/reconfigure multiple systems simultaneously.

Example Server

In the discussion herein, the invention is introduced in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices. It is to be appreciated, however, that the present invention may alternatively be implemented in hardware such as, for example, a microcontroller, a processor, an application specific integrated circuit (ASIC), a field-programmable gate array (FPGA), a programmable logic device (PLD), and the like.

Figure 2:
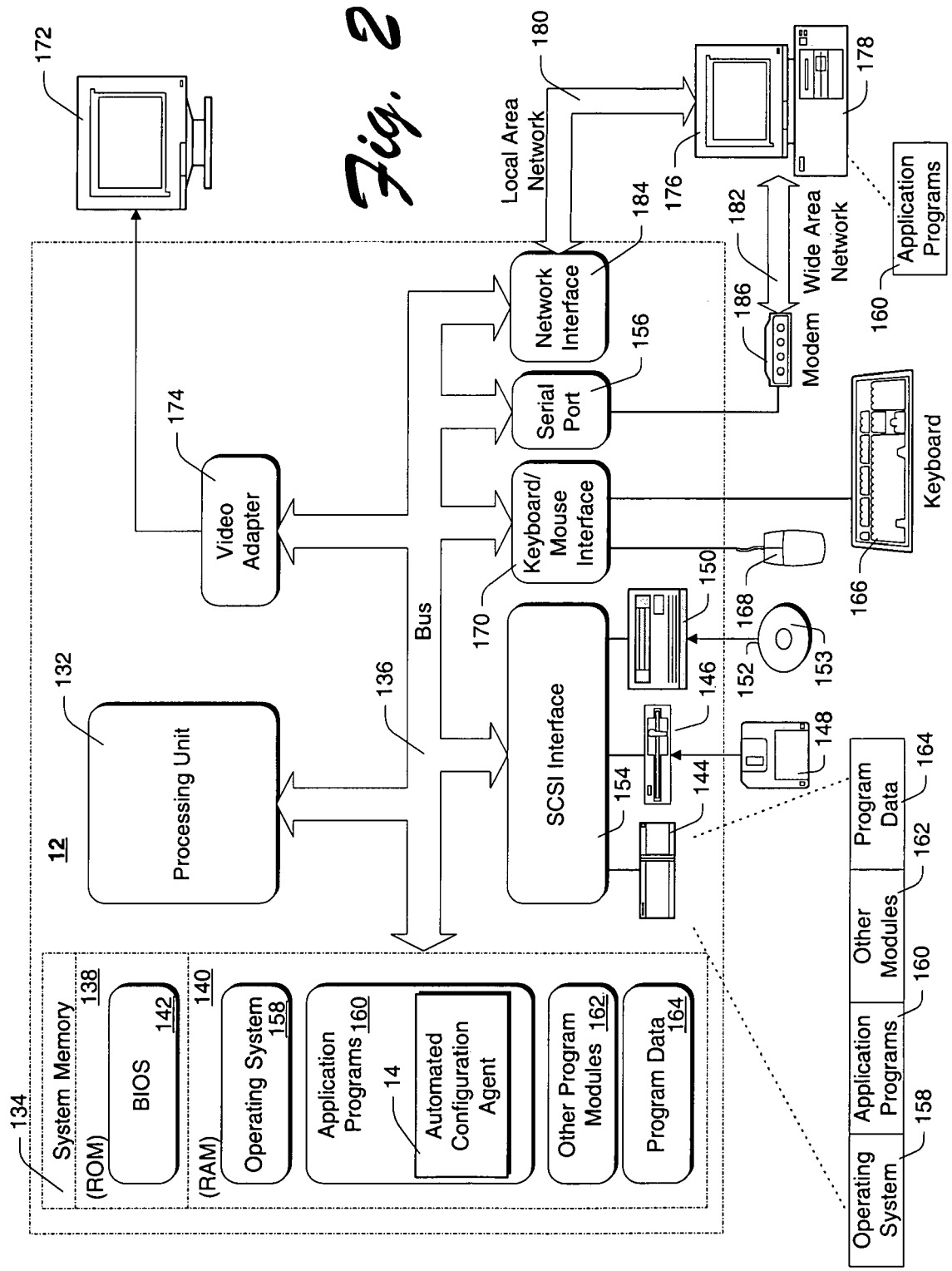
FIG. 2 is a block diagram of an example server incorporating an automated configuration agent, according to one aspect of the present invention.

FIG. 2 shows a general example of a server 12 incorporating the teachings of the present invention. It will be evident, from the discussion to follow, that server 12 is intended to represent any of a class of general or special purpose computing platforms which, when endowed with the innovative configuration agent 14, implement the teachings of the present invention. In this regard, the following description of server 12 is intended to be merely illustrative, as computer systems of greater or lesser capability may well be substituted without deviating from the spirit and scope of the present invention.

As shown, server 12 includes one or more processors or processing units 132 (controllers, or control logic), a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within server 12, such as during start-up, is stored in ROM 138. Server 12 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media.

The hard disk drive 144, magnetic disk drive 146, and optical disk drive 150 are connected to the bus 136 by a SCSI interface 154 or some other suitable bus interface. The drives and their associated computer-readable media provide non-volatile storage of computer readable instructions, data structures, program modules and other data for server 12.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), integrated circuit (IC) cards (or Smart Cards) and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, automated configuration agent 14, other program modules 162, and program data 164. A user may enter commands and information into server 12 through input devices such as keyboard 166 and pointing device 168. Other input devices (not shown) may include a microphone, joystick, game pad, satellite dish, scanner, or the like. These and other input devices are connected to the processing unit 132 through an input interface 170 that is coupled to bus 136.

A monitor 172 or other type of display device may also connected to the bus 136 via an interface, such as a video adapter 174. In addition to the monitor 172, computing systems often include other peripheral output devices (not shown) such as speakers and printers.

As shown, server 12 operates in a networked environment using logical connections to one or more remote computing and/or communication devices, such as, e.g., remote computer 176. The remote computer 176 may be a personal computer, a personal digital assistant, a server, a router or other network device, a network "thin-client" PC, a peer device or other common network node, and/or a communications device and typically includes some or all of the elements described above relative to server 12, although only a memory storage device 178 has been illustrated in FIG. 1.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, server 12 is connected to the local network 180 through a network interface or adapter 184. When used in a WAN networking environment, server 12 typically includes a modem 186 or other means for establishing communications over the wide area network 182, such as the Internet. The modem 186, which may be internal or external, is typically connected to the bus 136 via a serial port interface 156. In a networked environment, program modules depicted relative to the personal server 12, or portions thereof, may be stored in the remote memory storage device. It will be appreciated that the network connections shown are exemplary and other means of establishing a communications link between the computers may be used.

Generally, the data processors of server 12 are programmed by means of instructions stored at different times in the various computer-readable storage media of the computer. Programs and operating systems are typically distributed, for example, on floppy disks or CD-ROMs. From there, they are installed or loaded into the secondary memory of a computer. In accordance with the teachings of the present invention, however, such programs (applications), operating systems and configuration settings may automatically be installed in a computer system utilizing the innovative configuration agent 14. At execution, they are loaded at least partially into the computer's primary memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrating herein as discrete blocks, although it is recognized that such programs and components reside at various times in different storage components of the computer, and are executed by the data processor(s) of the computer.

Example Computing System

Figure 3:
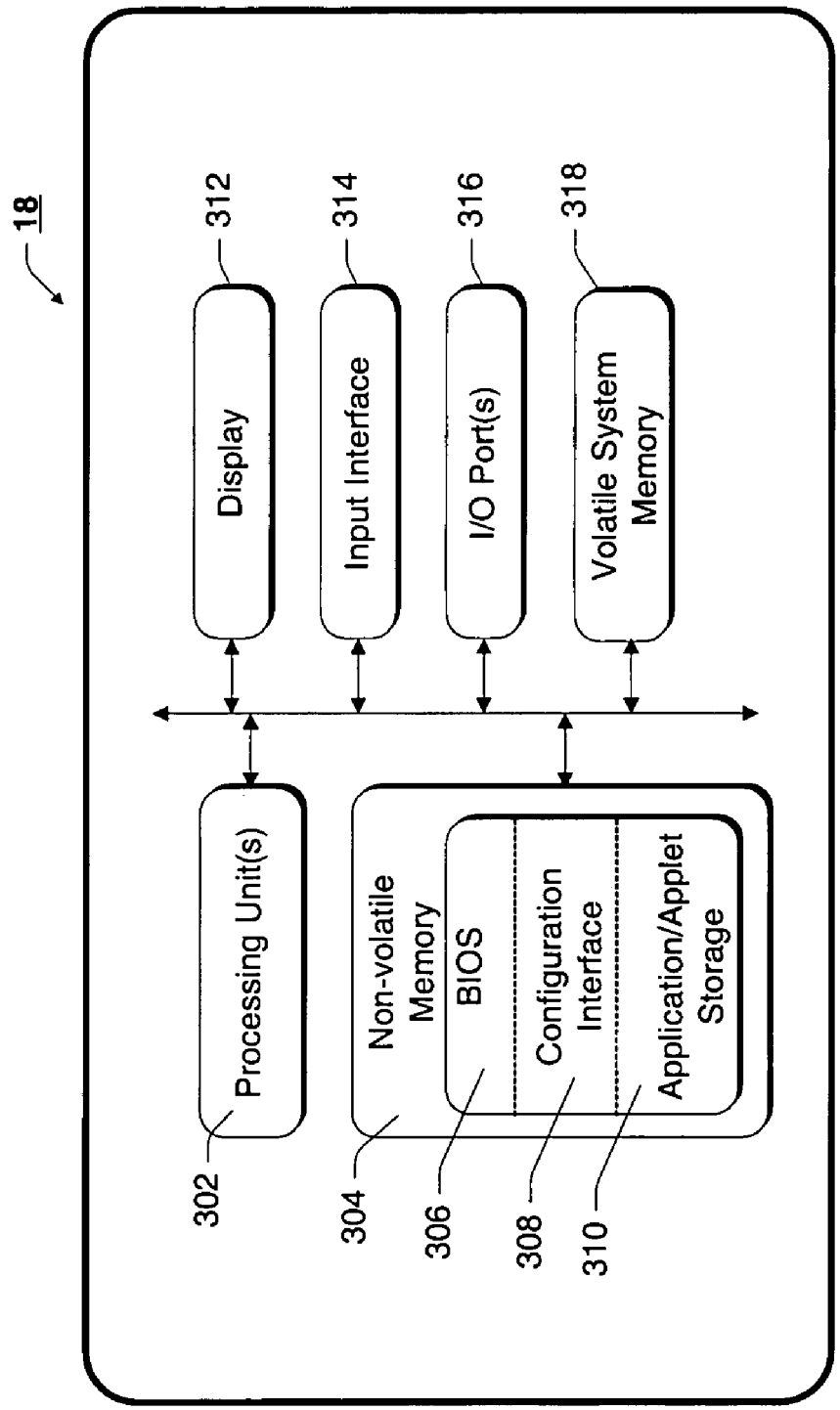
FIG. 3 is a block diagram of an example computing system incorporating a configuration interface, according to one aspect of the present invention.

FIG. 3 illustrates a block diagram of an example computer system 18, which interfaces with and is automatically configured by configuration agent 14, according to one embodiment of the present invention. In accordance with the illustrated example embodiment of FIG. 3, computing system 18 includes one or more processing unit(s) 302, a non-volatile memory device 304 initially including a basic input/output system (BIOS), a configuration interface 308 and additional storage space for an operating system, application(s), applet(s) and configuration/personalization information 310, a display 312, an input interface, input/output (I/O) ports 316 and a volatile system memory 318. It is to be appreciated that, but for configuration interface 308, elements 302 through 318 are each intended to represent any of a plurality of such elements that perform these functions and, thus, need not be described further.

According to one implementation of the present invention, a new computing system (e.g., computing system 18A) is provided to an end-user without any operating system, applications and/or configuration information pre-installed on the computer system. Rather, computing system 18A is provided with a fundamental level of functionality that minimally includes a BIOS 306 and the configuration interface 308. According to one implementation, configuration interface 308 transmits a unique identifier to the configuration agent 14 at server 12 to facilitate the automatic configuration of a host computing device. In addition, configuration interface 308 is used by configuration agent 14 to initially receive one or more of an operating system image, application(s), and configuration/personalization settings as configuration agent installs and configures the host computer with such resources.

According to one implementation, configuration interface 308 includes a user interface, which minimally enables an end-user to locate/specify a server 12 incorporating a configuration agent 14. In certain implementations, configuration interface 308 includes one or more elements of configuration agent 14 such as, for example, identification and characterization function (to be discussed more fully below with reference to configuration agent 14), to locally assess the hardware and/or software resources of computing system 18, and provide the assessment to configuration agent 14. In such an implementation, configuration agent 14 utilizes the assessment to identify additional resources and/or configuration information, and downloads the identified resources to configuration interface 308 for installation on the host computing system to enhance the operational capability of the host computing system.

In addition to the elements depicted in FIG. 3, depending on the actual embodiment, computing system 18 may well include one or more high capacity storage devices such as, for example, a hard disk drive, an optical drive, and the like with which to store the configuration interface 308, operating system, application(s), applet(s) and configuration/personalization information. In this regard, computing system 18 is intended to represent any of a number of electronic devices with processing capability such as, for example, a personal computer, a KIOSK terminal, an automated teller machine (ATM), a wireless telephony unit (e.g., cellular telephone), a wireline telephony unit, a personal digital assistant (PDA), a facsimile machine, a video media player, an audio system, a software defined radio (SDR) unit, and the like.

Example Configuration Agent

Figure 4:
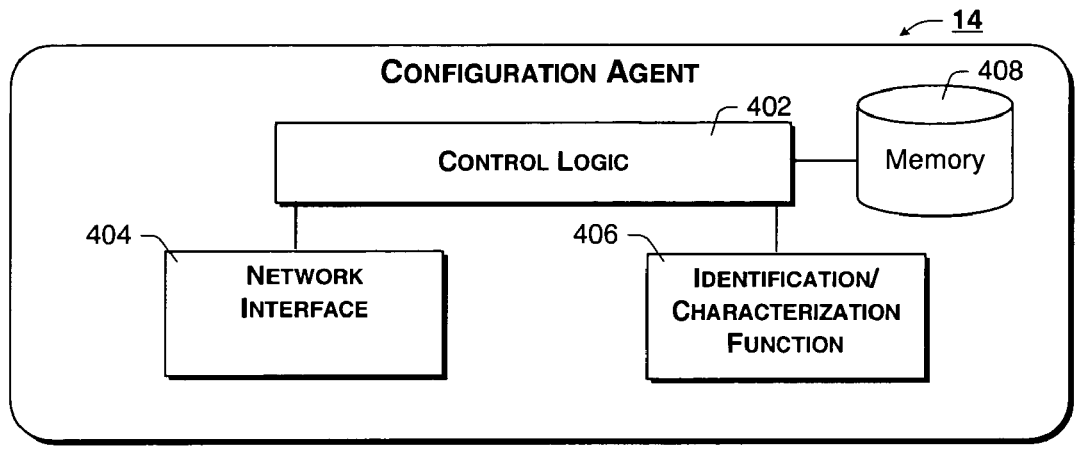
FIG. 4 is a block diagram of an example automated configuration agent, according to one embodiment of the present invention.

FIG. 4 illustrates a block diagram of an example configuration agent 14, according to one aspect of the present invention. As introduced above, upon receiving an indication associated with a computing system (e.g., 18) or computing system user, configuration agent 14 in cooperation with configuration interface 308 assess the hardware and/or software resources available on the computing system. Based, at least in part on the assessment, configuration agent 14 identifies needed resources and/or configuration/personalization information, and downloads and installs the identified resources to enhance the operational capability of the host computer. In this regard, configuration agent 14 and configuration interface 308 facilitate the automatic configuration and personalization of any of a number of host computing systems. It will be appreciated, given the following discussion, that configuration agent 14 may well be implemented in hardware, e.g., as an application specific integrated circuit (ASIC), or as a software application comprising a plurality of executable instructions which, when executed by a host system, implement the teachings of the present invention.

As shown, configuration agent 14 is generally comprised of control logic 402, network interface(s) 404, an identification and characterization function 406, and a memory device 408 each coupled as depicted. According to one implementation, memory 408 includes a data structure incorporating configuration information, personalization information, operating system information and application information for one or more users.

Control logic 402 selectively invokes and manages the automated configuration features of configuration agent 14. In particular, control logic selectively invokes configuration agent 14 upon receiving an indication associated with a remote computing system and/or computing system user. According to one implementation, the indication is a unique identifier associated with the computing system to be (re) configured and/or with the computing system user. A number of suitable identifiers may well be used in accordance with the teachings of the present invention including, but not limited to, an email address, a physical address, a virtual address, a network address, a global unit identifier, a serial number associated with the computing system, and the like.

Upon receiving the identifier, control logic 14 invokes the identification and characterization function to identify the computing system associated with the unique identifier and to assess the hardware and/or software resources of the computing system. Based, at least in part on the assessment, control logic 402 identifies zero or more resources to download, configure and/or reconfigure and proceeds to download, configure and reconfigure the identified resources on the computing system (e.g., 18). Except as configured to effect the teachings of the present invention, control logic 402 is intended to represent any of a number of alternate control systems known in the art including, but not limited to, a microprocessor, a programmable logic array (PLA), a micromachine, an application specific integrated circuit (ASIC) and the like. In an alternate implementation, control logic 402 is intended to represent a series of executable instructions to implement the control logic described above.

Identification and characterization agent 406 is selectively invoked by control logic in response to receiving an indication associated with a computing system and/or computing system user. Given the received indication, identification and characterization function 406 accesses a communicatively coupled data structure (e.g., within memory 408) to identify the computing system. According to one implementation, if the computing system cannot be identified, identification and characterization function 406 responds to the computing system issuing the indication (i.e., not necessarily the computing system to be configured) that the identifier provided is invalid. According to an alternate implementation, identification and characterization function 406 accesses additional data stores either locally (not shown) or communicative coupled via one or more networks (20 and 22) to attempt to match the identifier with a computing system.

Once the computing system is identified from the identifier, identification and characterization function 406 assesses and documents the operational resources (e.g., operating system, configuration settings, personalization settings, Internet settings, application settings, etc.) of the computing system. The assessment is provided to control logic 402, which, as described above, identifies resources for downloading, installation and configuration on the computing system. According to one implementation, the resources are downloaded as self-extracting image files to the computing system via configuration interface 308. According to an alternate implementation, the resources are downloaded to configuration interface 308 of the computing system, whereupon configuration interface 308 installs and configures the downloaded resources within the host computing system.

Network interface 404 communicatively couples configuration agent 14 to one or more networks (20 and/or 22), facilitating the communication between configuration agent 14 and computing system(s) 18 necessary to automatically configure such computing systems. In an alternate implementation, configuration agent 14 does not include integrated network interface 404, but rather relies on the network interface resources (184) of a host server (12). But for integration within the innovative configuration agent 14, network interface is intended to represent any of a number of such network interfaces known in the art and, as such, need not be further described herein.

Although described as separate functional elements, it is to be appreciated that one or more of control logic 402, network interface 404, identification/characterization function 406 and/or memory 408 may well be integrated into a single functional element. Moreover, it is to be appreciated that identification/characterization function 406 may well be implemented in hardware or a series of executable instructions which, when executed by control logic 402 and/or processing units 132, implement the innovative functions described above. In this regard, configuration agent 14 of FIG. 4 is intended to be merely illustrative of the claimed invention.

Example Data Structures

Figures 5, 6:
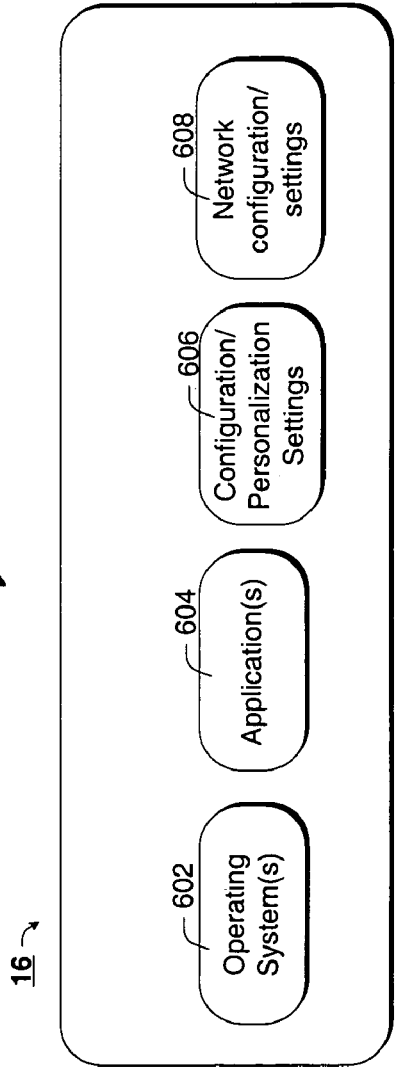
FIG. 5 is a graphical illustration of an example data structure incorporating configuration information, according to one implementation of the present invention.
FIG. 6 is a graphical representation of an example storage medium having stored therein one or more operating system (s), Internet application(s) and plugin(s), and application(s), which are selectively downloaded to and configured on computing systems.

FIG. 5 graphically illustrates an example data structure incorporating configuration and personalization settings for a plurality of computing systems and/or computing system users, suitable for use in accordance with the present invention. Although depicted as residing in a single memory location, this is for ease of illustration only, as the information comprising data structure 408 may well be contained in a number of disparate files among a number of memory/storage devices (not shown) communicatively coupled to configuration agent 14. Indeed, according to one implementation, each of the operating system, Internet configuration and settings, and application configuration and personalization each reside in dedicated files on one or more memory/storage devices. Thus, it is to be appreciated that data structures of greater or less complexity may well be used without deviating from the spirit and scope of the present invention.

In accordance with the illustrated example embodiment of FIG. 5, the data structure depicted includes a user identification field 502, a group identification field 504 and operating system configuration and personalization fields 506. In addition, data structure 500 further includes internet configuration and personalization fields 508 and application configuration and personalization fields 510. At least a subset of fields 502-510 are populated for each of a plurality of system users, e.g., user 512. According to one implementation, the information in data structure 408 is gathered from a number of otherwise disparate locations. In one implementation, for example, upon the sale of a computing system, a sales clerk obtains and enters personal information into an electronic form, which is sent or retrieved by configuration agent 14. Control logic 402 translates information from the form into configuration and personalization settings. In one implementation, a user may subscribe to a service in which they are periodically provided operating system and application updates, configuration and personalization settings/modifications, and the like. In yet another implementation, data structure 408 is populated by a data mining utility (not shown) executing on a server and loosely associated/affiliated with configuration agent to the extent that information gathered is provided to configuration agent 14 for inclusion in data structure 408.

As introduced above, once control logic 402 receives a unique identifier, it accesses data structure 408 in an attempt to identify the computing system associated with the identifier. According to the illustrated example embodiment, control logic 402 scans the records of fields 502 and/or 504 looking for a match. Assuming a match is found, control logic 402 identifies how the particular computing system is supposed to be configured given the information in fields 506-510 associated with the located identifier. Control logic 402 reviews the assessment of the computing system resources developed by identification and characterization function 406 and identifies which resources and/or configuration and personalization settings need to be downloaded and installed in the computing system.

FIG. 6 graphically represents a data store including operating system(s), Internet application(s) and configuration setting(s), and application(s), suitable for use in accordance with the present invention. According to the illustrative embodiment of FIG. 6, storage device 16 includes operating system(s) 602, application(s) 605, configuration and personalization settings 606, and network configuration settings 608 that configuration agent 14 selectively downloads and installs in an identified computing system. More particularly, once configuration agent 14 identifies a discrepancy between the information contained in data structure 408 and the assessed resources of the computing system, control logic 402 accesses data store 16 to collect, download and install the resources necessary to bring the computing system into compliance with the information contained in data structure 408. As discussed above, although data store 16 is illustrated as a single storage/memory device, this is for ease of illustration only. That is, the elements of data store 16 may well be stored in separate data stores communicatively coupled to configuration agent 14 without deviating from the spirit and scope of the present invention.

Example Operation and Implementations

Figure 7:
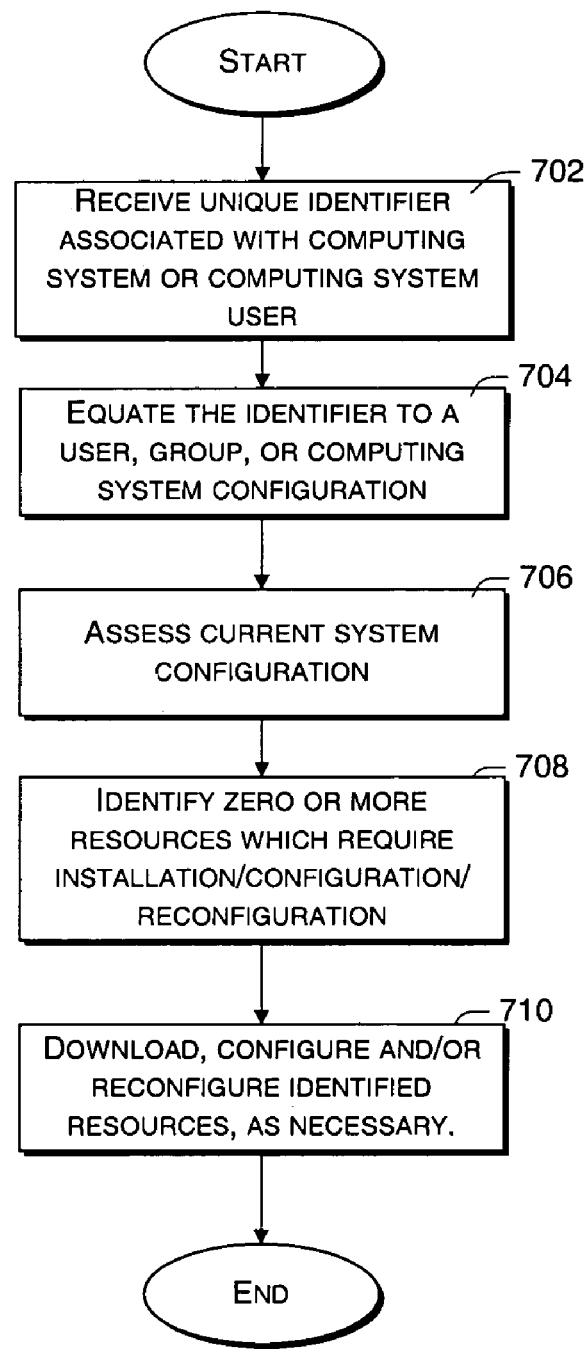
FIG. 7 is a flow chart of an example method for automatically configuring/reconfiguring a computing system.

FIG. 7 is a flow chart of an example method for automatically configuring a computing system, in accordance with the teachings of the present invention. For ease of explanation, and not limitation, the method of FIG. 7 will be developed with continued reference to FIGS. 1-6.

In accordance with the illustrated example implementation, the method of FIG. 7 begins with block 702 wherein configuration agent 14 receives a unique identifier associated with a computing system or computing system user. More specifically, control logic 402 receives an identifier from a communicatively coupled network (20, 22) via network interface 404. It is to be appreciated that the identifier is merely associated with a particular computing system or computing system user. That is, the identifier need not be issued by the computing system, but may be sent by another computing system, communications device, etc. Just such an implementation scenario will be developed more fully with reference to FIG. 9, below.

In response to receiving the identifier, control logic 402 invokes the identification facilities of identification and characterization function to access data structure 408 and equate the received identifier with a known user, user group, or computing system configuration, block 704. As introduced above, if the identifier is not located within data structure 408, control logic 402 may issue an error notification to the sending user. Alternatively, control logic may present the user with a user interface (not shown), wherein the user can select the OS, applications, Internet settings, and personalization information to be installed on the computing system.

In block 706, configuration agent 14 assesses the current resources of the identified computing system. More particularly, control logic 402 selectively invokes the characterization facilities of identification and characterization function 406 to assess the system resources of the computing system. According to one implementation, identification and characterization function 406 communicates with the computing system via network interface 404 and the configuration interface 308. Identification and characterization function 406 interrogates one or more system resources (e.g., a processor, memory systems, storage devices, etc.) to develop an assessment of the current system resources of the computing system. Based on the review of system resources, identification and characterization function 406 provides control logic 402 with a report of current system resources.

In block 708, control logic 402 identifies zero or more resources which require installation, configuration and/or reconfiguration on the computing system based, at least in part, on the report received from identification and characterization function 406. More particularly, control logic 402 compares the received report against the authorized and available resources associated with the computing system in data structure 408 to identify needed resources for the computing system.

In block 710, the identified resources are downloaded to and configured on the computing system. That is, based on the identified resource needs, control logic 402 selectively accesses one or more data stores (e.g., 16) to collect the identified resources. According to one implementation, the identified resources are compressed and stored as a self-extracting image file that is downloaded to the computing system via network interface 404, one or more networks (20, 22) and configuration interface 308. Once the self-extracting image file is completely downloaded, it is installed on the computing system.

In accordance with an alternate embodiment, control logic 402 downloads, installs and selectively configures the identified resources on an individual basis via network interface 404, coupled networks (20, 22) and configuration interface 308. The process continues until all the identified resources have been installed/configured on the computing system.

Figure 8:
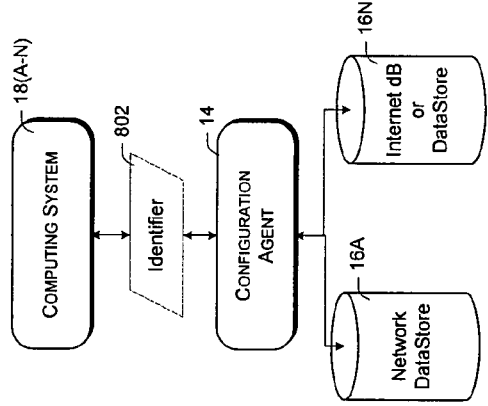
FIGS. 8 and 9 graphically depict an example communication between computing system(s) and the configuration agent to automatically configure one or more computing systems.
Figure 9:
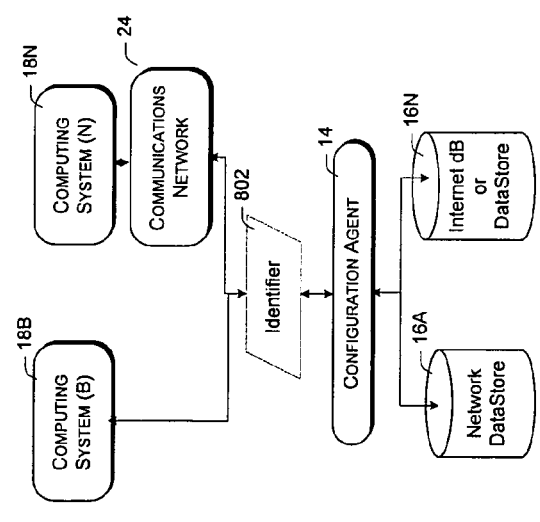

FIGS. 8 and 9 graphically depict example implementations for automatically configuring one or more computing system(s), in accordance with the teachings of the present invention.

With reference to FIG. 8, an example implementation is illustrated wherein a computing system issues an indicator to configuration agent 14 to automatically configure/reconfigure the computing system. As shown, computing system 18A issues an identifier 802 to configuration agent 14 at server 12 to install/configure/reconfigure one or more resources on computing system 18A.

In response, configuration agent 14 locates the identifier within data structure 408 (not shown) and identifies an authorized configuration for computing system 18A. Identification and characterization function 406 is invoked to assess the resources of the computing system, providing control logic 402 with the results of such assessment. Control logic 402 compares the authorized resources against the assessed resources to identify limitations in the current capability of computing system 18A, and accesses a local network data store 16A and/or an Internet data store 16N to collect the resources. Once collected, configuration agent 14 downloads, installs and configures the resources on the computing system 18, as necessary.

In this manner, a computer system is automatically configured with all authorized and available resources (including configuration and personalization settings) automatically and without the assistance of a computing technician.

FIG. 9 illustrates an example implementation wherein the computing system to be configured is not the source of the issued identifier. Rather, a communication device 18N (also a type of computing system, as defined herein) issues the identifier to configure/reconfigure a computing system 18B associated with the user of the communications device. According to one implementation, a user utilizes the communications device 18N to place a call to a telephone number associated with configuration agent 14. When the call is answered, one or more identifiers associated with the communications device is received such as, for example, the telephone number and/or electronic serial number (ESN), the name of the user associated with the communications device (e.g., via caller-ID), and the like. Configuration agent 14 receives the identifier(s), invokes the identification facilities of identification and characterization function 406 and attempts to correlate the received identifier to a corresponding computing system. If successful, configuration agent 14 assesses the resources of the computing system 18B, downloading, installing and configuring resources on computing system 18B in accordance with the results of the assessment, as described above.

In addition to assessing and modifying the resources of computing system 18B, as introduced above, configuration agent 14 may also assess and modify the resources of the initiating computing/communications device (e.g., 18N). In accordance with this alternate implementation, a single call from communications device 18N initiates a review and updating of resources on both computing system 18B and 18N.

The foregoing implementations are provided to illustrate the broader innovative concepts which embody the present invention. It is to be appreciated that additional implementations may well be conceived incorporating the teachings of the present invention. In one implementation of the present invention, for example, consider migrating a configuration/operating environment between devices. According to one implementation of the present invention, wherein the configuration and operating environment information is stored on an accessible server, migrating at least a subset of the configuration/operating environment from desktop systems, to personal digital assistant (PDA), communications device (e.g., cell phone, pager, etc.) is performed automatically. It is to be appreciated that the present invention enables the user to experience the same/similar computing system environment/configuration regardless of the physical electronic device used to realize the environment/configuration.

In another example implementation, a global positioning system utilizes the features of the present invention. Today, users of a GPS system typically must have a compact disc (CD) with regional maps (because the GPS system only provides global location (e.g., latitude and longitude) coordinates). If a user does not have a map for a particular region, they are unable to utilize the mapping features of the GPS receiver. The teachings of the present invention, however, alleviate the prior art need for GPS CDs. Instead, a GPS system incorporating the teachings of the present invention utilizes an accessible server with the regional mapping information. Upon entering a new region, the GPS system identifies the needed regional information and downloads the map information to the GPS receiver. A business application of such a system would provide the regional mapping information automatically to the GPS receiver as a fee-based service. Thus, it is to be appreciated that the present invention, limited only by the claim language below, may well be used in many alternate applications.

Figure 10:
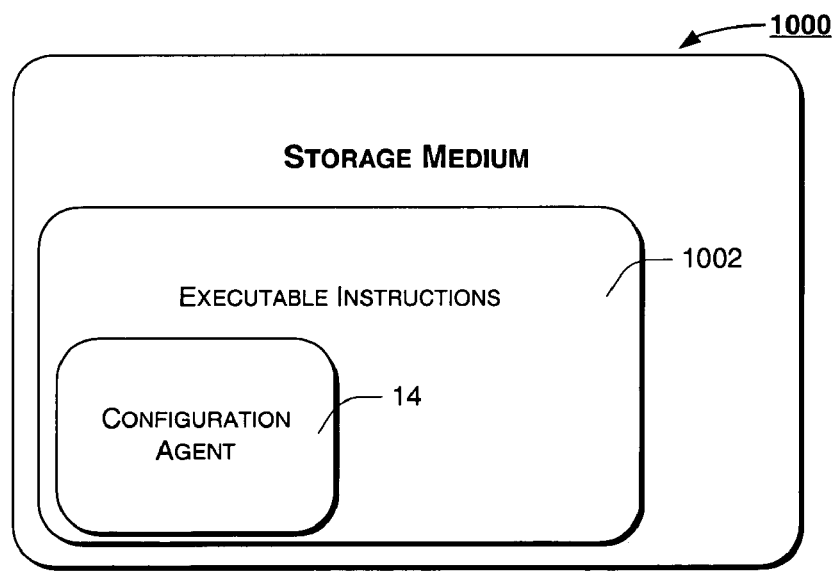
FIG. 10 is a block diagram of an example storage medium comprising a plurality of executable instructions that when executed implement the automated configuration agent of the present invention, according to one embodiment of the present invention.

FIG. 10 is a block diagram of a storage medium having stored thereon a plurality of instructions including instructions to implement the teachings of the present invention, according to yet another embodiment of the present invention. In general, FIG. 10 illustrates a storage medium/device 1000 having stored thereon a plurality of executable instructions 1002 including at least a subset of which that, when executed, implement the automated configuration agent 14 of the present invention. When executed by a processor of a host system, the executable instructions implementing configuration agent 14 assess and modify the resources of a computing system to automatically configure the operating system, internet settings and/or configuration and personalization settings of the host system.

As used herein, storage medium 1000 is intended to represent any of a number of storage devices and/or storage media known to those skilled in the art such as, for example, volatile memory devices, non-volatile memory devices, magnetic storage media, optical storage media, and the like. Similarly, the executable instructions are in machine language, interpreted languages, and/or other source code that will be interpreted, such as, for example, C, C++, Visual Basic, Java, Smalltalk, Lisp, eXtensible Markup Language (XML), and the like. Moreover, it is to be appreciated that the storage medium/device 1000 need not be co-located with any host system. That is, storage medium/device 1000 may well reside within a remote server communicatively coupled to and accessible by an executing system. Accordingly, the software implementation of FIG. 10 is to be regarded as illustrative, as alternate storage media and software embodiments are anticipated within the spirit and scope of the present invention.

Although the invention has been described in language specific to structural features and/or methodological acts, it is to be understood that the invention defined in the appended claims is not necessarily limited to the specific features or steps described. Rather, the specific features and steps are disclosed as example forms of implementing the claimed invention.

The invention claimed is:

1. A method comprising:

maintaining, on a server for each of a plurality of computing systems, data specifying which resources are authorized for the computing system;

receiving, by a configuration agent at the server, an identifier associated with a computing system and a computing system user, wherein the identifier associated with the computing system and computing system user comprises a telephone number associated with a first communications device associated with the computing system and is received from the first communications device associated with the computing system, wherein the first communications device is not coupled directly to the computing system, and wherein the first communications device is selected from the group consisting of:

a wireless telephony unit,
   a cellular telephone,
   a personal digital assistant,
   a personal computer,
   a KIOSK terminal,
   an automated teller machine,
   a wireline telephony unit,
   a facsimile machine, a video media player,
an audio system, and
a software defined radio unit;
obtaining, by the configuration agent, from the server, data that specifies authorized resources corresponding to the received identifier;
interrogating, by the configuration agent, the computing system to produce an assessment indicating existing hardware and/or software resources available on the computing system, wherein software resources include one or more of an operating system, application(s), and personalized configuration setting information;
comparing, by the configuration agent, the authorized resources with the assessment to identify one or more resources authorized but not installed on the computing system, wherein one or more resources authorized but not installed does not include updates of currently installed resources; and
automatically modifying by the configuration agent the computing system resources by installing the one or more identified resources.

2. A method according to claim 1, wherein one or more resources authorized but not installed includes updates of currently installed resources.

3. A method according to claim 1, further comprising:
automatically modifying system resources of the first communications device based, at least in part, on the assessment of the computing system resources.

4. A method according to claim 1, further comprising:
selectively installing certain of the computing system resources based, at least in part, on the comparison of the assessed computing system resources against authorized and available computing system resources.

5. A method according to claim 1, wherein the computing system is a second communications device, the method further comprising:
assessing the resources of the second communications device;
comparing the assessed resources of the second communications device against authorized and available communications device resources; and
selectively installing, configuring and/or updating one or more resources of the second communications device based, at least in part, on the assessed resources of the second communications device.

6. A method according to claim 1, wherein the identifier is received from the first communications device associated with the computing system remote from the computing system, the method further comprising:
automatically modifying resources of the computing system based, at least in part, on an assessment of the communications device resources.

7. A method according to claim 6, wherein the identifier further comprises one or more of an electronic serial number (ESN) of the first communications device associated with the computing system, an electronic identifier associated with the computing system, and/or a serial number associated with one or more hardware and/or software resources of the computing system.

8. A method according to claim 1, wherein the identifier further comprises one or more of an electronic serial number (ESN) of the first communications device associated with the computing system, an electronic identifier associated with the computing system, and/or a serial number associated with one or more hardware and/or software resources of the computing system.

9. A storage medium comprising a plurality of executable instructions which, when executed, implement a method according to claim 1.

10. A server comprising:
a storage device having stored therein a plurality of executable instructions; and
a control unit, coupled to the storage device, to execute at least a subset of the plurality of executable instructions to implement a method according to claim 1.

11. A server comprising:
a storage device to maintain a profile of personal resources specifying, for each of a plurality of computing systems, resources that are authorized for each of the plurality of computing systems; and
a configuration agent, coupled to the storage device, to perform a method comprising:
receiving, from a communications device associated with a computing system, an identifier associated with the communications device, wherein the identifier comprises a telephone number and the communications device is not coupled directly to the computing system;
involving an identification function to correlate the identifier to a corresponding computing system;
generating an assessment of current resources of the corresponding computing system;
identifying, by comparing the assessment with the resources that are authorized, one or more of the resources that are authorized and that are missing from the corresponding computing system, wherein one or more of the resources that are authorized and missing does not include updates of a currently installed-resource; and
automatically configuring resources of the corresponding computing system to include the identified resources that are authorized and that are missing.

12. A server according to claim 11, wherein the generating an assessment of the current resources of the corresponding computing system comprises assessing at least one of an operating system, configuration settings, personalization settings, Internet settings or application settings on the corresponding computing system.

13. A server according to claim 11, wherein the profile of personal resources includes a list of identifiers associated with authorized users and the configuration agent accesses a user profile on the storage device based, at least in part, on the identifier.

14. A server according to claim 11, wherein the configuration agent further automatically modifies communications device resources based, at least in part, on an assessment of communications device resources.

15. A server according to claim 11, wherein the configuration agent is further configured to update the computing system resources.

16. A server according to claim 11, wherein the identifier further comprises one or more of an electronic serial number (ESN) of the first communications device associated with the computing system, an electronic identifier associated with the computing system, a serial number associated with one or more hardware and/or software resources of the computing system.

17. A server according to claim 11, wherein the storage device includes a plurality of executable instructions, the server further comprising:
a controller, coupled to the storage device, to execute at least a subset of the plurality of executable instructions to implement an instance of the configuration agent.

18. A storage medium comprising a plurality of executable instructions including at least a subset of which that, when executed, implement a configuration agent at a server to perform a method comprising:
  maintaining, for each of a plurality of computing systems, data specifying resources that are authorized for the computing system;
  conducting an assessment of computing system resources upon receipt of an identifier associated with the computing system wherein the identifier comprises a telephone number and is received from a communications device remote from the computing system;
  identifying, by comparing the assessment with corresponding data specifying resources that are authorized, one or more of the resources that are authorized which are missing from the computing system, wherein one or more missing resources that are authorized does not include updates of currently installed resources; and
  automatically downloading and installing on the computing system the missing resources that are authorized.

19. A storage medium according to claim 18, wherein the configuration agent is further configured to update computing system resources.

20. A storage medium according to claim 18, wherein the configuration agent interrogates the computing system upon receipt of the identifier to assess computing system resources.

21. A storage medium according to claim 20, wherein the configuration agent modifies the computing system resources to include available and authorized resources based, at least in part, on the assessment of the computing system resources.

22. A storage medium according to claim 18, wherein the computing system is a communications device.

23. A storage medium according to claim 18, wherein the configuration agent automatically modifies computing system resources and communications device resources based, at least in part, on assessment of system resources of the computing system and communications device.

* * * * *